(12) United States Patent
Wei

(10) Patent No.: US 10,808,805 B2
(45) Date of Patent: Oct. 20, 2020

(54) DRILLING MACHINE AND TRANSMISSION STRUCTURE THEREOF

(71) Applicant: MINCHUEN ELECTRICAL MACHINERY CO., LTD, Taichung (TW)

(72) Inventor: Ta Chuang Wei, Taichung (TW)

(73) Assignee: MINCHUEN ELECTRICAL MACHINERY CO., LTD., Taichung (TW)

( * ) Notice: Subject to any disclaimer, the term of this patent is extended or adjusted under 35 U.S.C. 154(b) by 292 days.

(21) Appl. No.: 15/946,244

(22) Filed: Apr. 5, 2018

(65) Prior Publication Data
US 2019/0309829 A1   Oct. 10, 2019

(51) Int. Cl.
  *F16H 3/32*  (2006.01)
  *B23B 39/10* (2006.01)
  *B23Q 5/12*  (2006.01)

(52) U.S. Cl.
  CPC .............. *F16H 3/32* (2013.01); *B23B 39/10* (2013.01); *B23Q 5/12* (2013.01); *B23Q 2705/023* (2013.01)

(58) Field of Classification Search
  CPC ......... B23B 39/10; B23B 47/30; B23Q 5/142; B23Q 5/12; F16H 3/32
  See application file for complete search history.

(56) References Cited

U.S. PATENT DOCUMENTS

| 1,340,585 | A | * | 5/1920 | Waite | B23Q 5/142 74/333 |
| 1,415,515 | A | * | 5/1922 | Bouillon | F16H 3/32 74/342 |
| 2,676,494 | A | * | 4/1954 | Olson | F16H 37/00 74/370 |
| 7,827,885 | B2 | * | 11/2010 | Rowell | B25B 17/00 81/57.3 |
| 2009/0064810 | A1 | * | 3/2009 | Bodine | F16D 7/002 74/333 |
| 2015/0122063 | A1 | * | 5/2015 | Elger | B23Q 5/142 74/325 |
| 2016/0263661 | A1 | * | 9/2016 | Tseng | B23B 39/10 |

FOREIGN PATENT DOCUMENTS

DE         1209404 B  *  1/1966  ............... B23Q 5/12

* cited by examiner

*Primary Examiner* — Terence Boes
(74) *Attorney, Agent, or Firm* — Muncy, Geissler, Olds & Lowe, P.C.

(57) ABSTRACT

A transmission structure of a drilling machine contains: a housing, a drive shaft, a drive gear, a guide gear, a speed change gear assembly, a driven gear assembly, and a control knob. The housing include a first accommodation groove for housing the drive shaft, a second accommodation groove for accommodating the guide shaft, a third accommodation groove for housing the speed shaft, and a fourth accommodation groove for accommodating the driven shaft. The drive gear is connected on the drive shaft, and the guide gear is coupled on the guide shaft and meshes with the drive gear. The speed change gear assembly includes a connection gear and at least two speed change gears. The driven gear assembly includes at least two driven gears corresponding to at least two speed change gears respectively. The control knob configured to drive the driven gear assembly to move upward and downward.

4 Claims, 4 Drawing Sheets

DRILLING MACHINE AND TRANSMISSION STRUCTURE THEREOF

FIELD OF THE INVENTION

The present invention relates to a drilling machine and a transmission structure of the drilling machine which change rotation speed of the drilling machine and reduce operation danger.

BACKGROUND OF THE INVENTION

Referring to FIGS. 1-3, a transmission structure of a conventional drilling machine contains a housing 10 in which a first accommodation groove 101 and a second accommodation groove 102 are defined; a drive shaft 11 and a variable speed pulley set 111 which are accommodated in the first accommodation groove 101 and are directly driven by a motor; a driven shaft 12 and a driven pulley set 121 which are housed in the second accommodation groove 102, wherein the driven shaft 12 drives a drill bit 13 of the drilling machine to rotate. The variable speed pulley set 111 includes at least two variable speed pulleys of different diameters, and the at least two variable speed pulleys are coaxially connected. The driven pulley set 121 includes at least two driven pulleys coaxially connected and respectively corresponding to the at least two variable speed pulleys, and a belt 14 is defined between the at least two variable speed pulleys and the at least two driven pulleys. Furthermore, a lid 15 covers the housing 10.

However, the conventional drilling machine has following defects:

1. As drilling holes of different materials, the drilling machine is set in a predetermined rotation speed and torque. As desiring to change the rotation speed, the lid 15 is removed so as to expand the belt 14 and to fit on the at least two variable speed pulleys and the at least two driven pulleys, thus changing the rotation speed troublesomely. Furthermore, when the belt 14 is fitted on the at least two variable speed pulleys and the at least two driven pulleys, the motor is turned on, thus casing operation danger.

2. The transmission efficiency of the convectional drilling machine is quite low, because the belt 14 drives the at least two variable speed pulleys and the at least two driven pulleys. In addition, the belt 14 has to be replaced after a period of using time, thus increasing maintenance cost.

The present invention has arisen to mitigate and/or obviate the afore-described disadvantages.

SUMMARY OF THE INVENTION

The primary objective of the present invention is to provide a drilling machine and a transmission structure of the drilling machine which change rotation speed of the drilling machine and reduce operation danger.

To provide a drilling machine and a transmission structure of the drilling machine provided by the present invention contains: a housing, a drive shaft, a drive gear, at least one guide gear, a speed change gear assembly, a driven gear assembly, and a control knob.

The housing includes a first accommodation groove, a second accommodation groove, a third accommodation groove, and a fourth accommodation groove.

The drive shaft is housed in the first accommodation groove, the at least one guide shaft is accommodated in the second accommodation groove, the speed shaft is housed in the third accommodation groove, and the driven shaft is accommodated in the fourth accommodation groove.

The drive gear is connected on the drive shaft and is directly driven by a motor.

The at least one guide gear is coupled on the at least one guide shaft and meshing with the drive gear.

The speed change gear assembly is connected on the speed shaft and includes a connection gear, at least two speed change gears which are coaxially connected and have different diameters respectively, wherein the connection gear meshes with the at least one guide gear.

The driven gear assembly is coupled on the driven shaft and includes at least two driven gears which are coaxially connected and corresponding to at least two speed change gears respectively, wherein the at least two driven gears has different diameters respectively, and the driven shaft drives a drill bit of the drilling machine.

The control knob is configured to drive the driven gear assembly to move upward and downward, wherein the at least two driven gears of different diameters respectively mesh with the at least two speed change gears of different diameters.

DETAILED DESCRIPTION OF THE PREFERRED EMBODIMENTS

Figure 1:
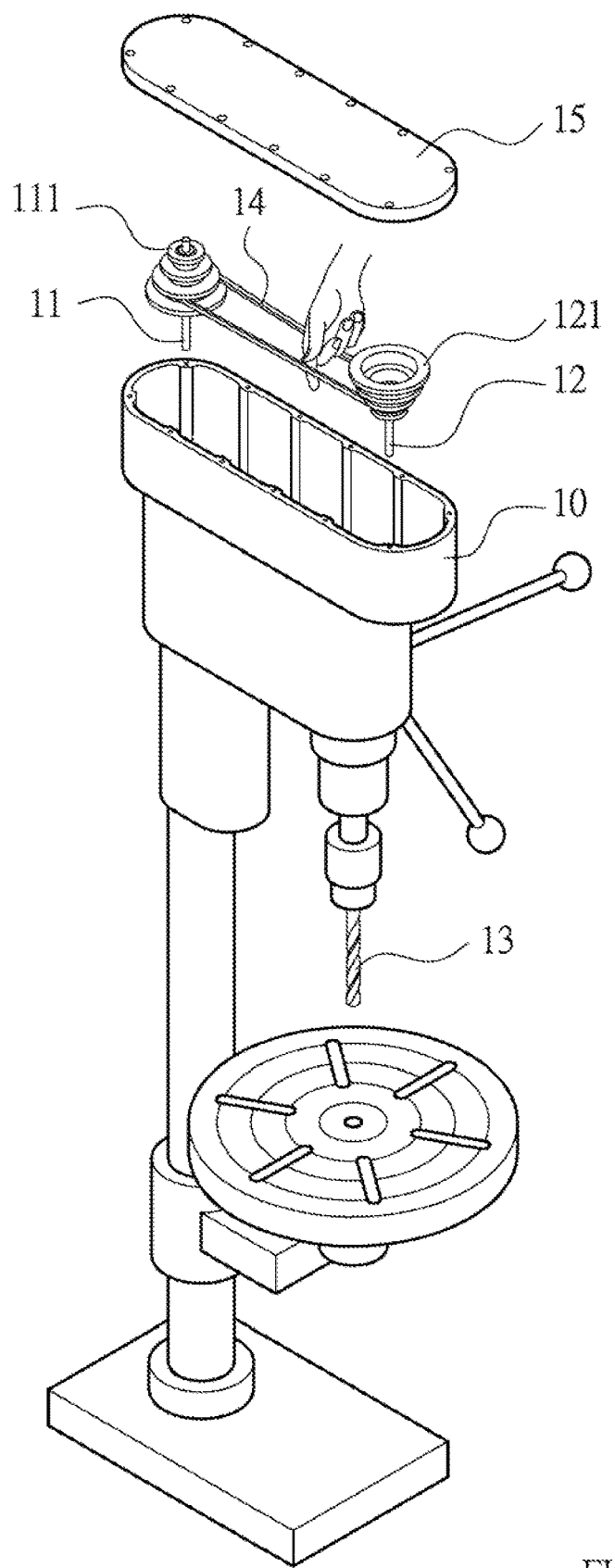
FIG. 1 is a perspective view showing the exploded components of a transmission structure of a conventional drilling machine.
Figure 2:
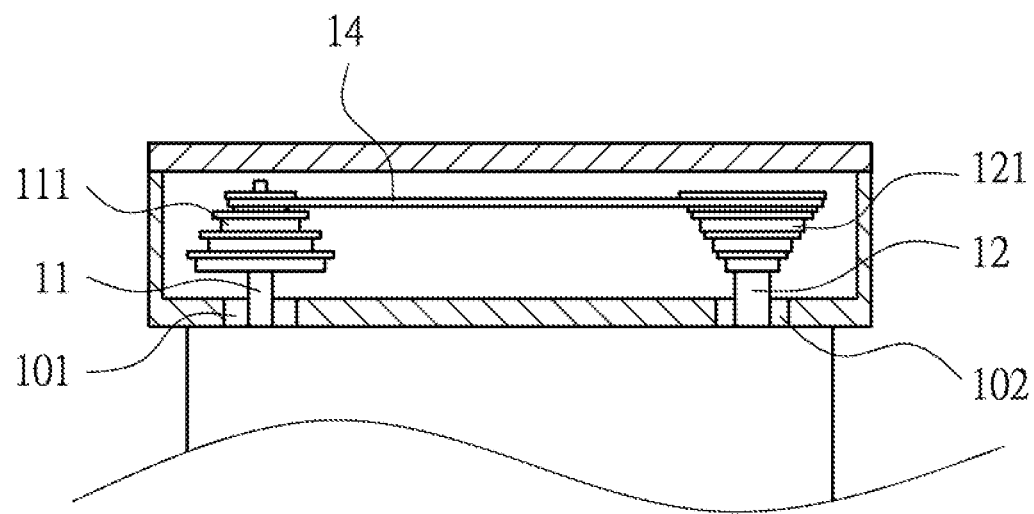
FIG. 2 is a cross sectional view showing the operation of the transmission structure of the conventional drilling machine.
Figure 3:
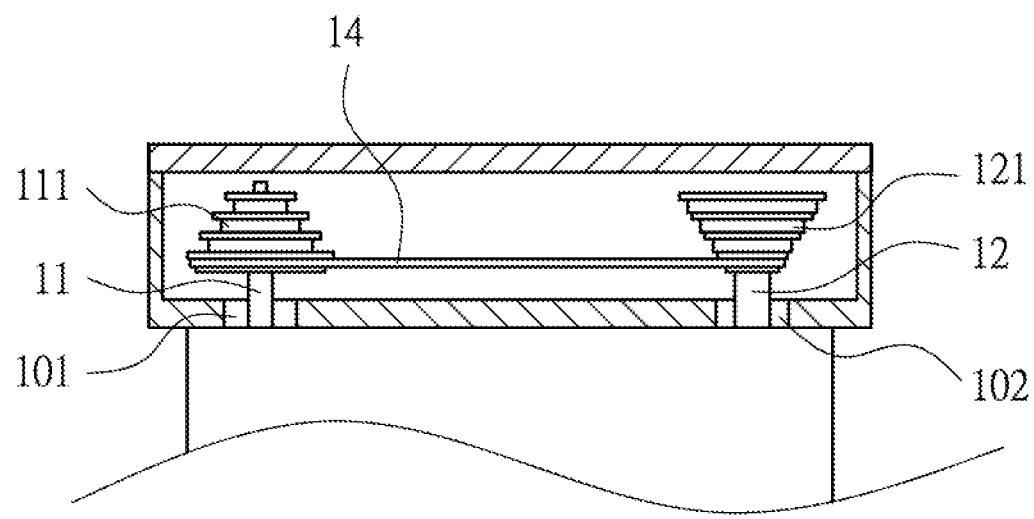
FIG. 3 is another cross sectional view showing the operation of the transmission structure of the conventional drilling machine.
Figure 4:
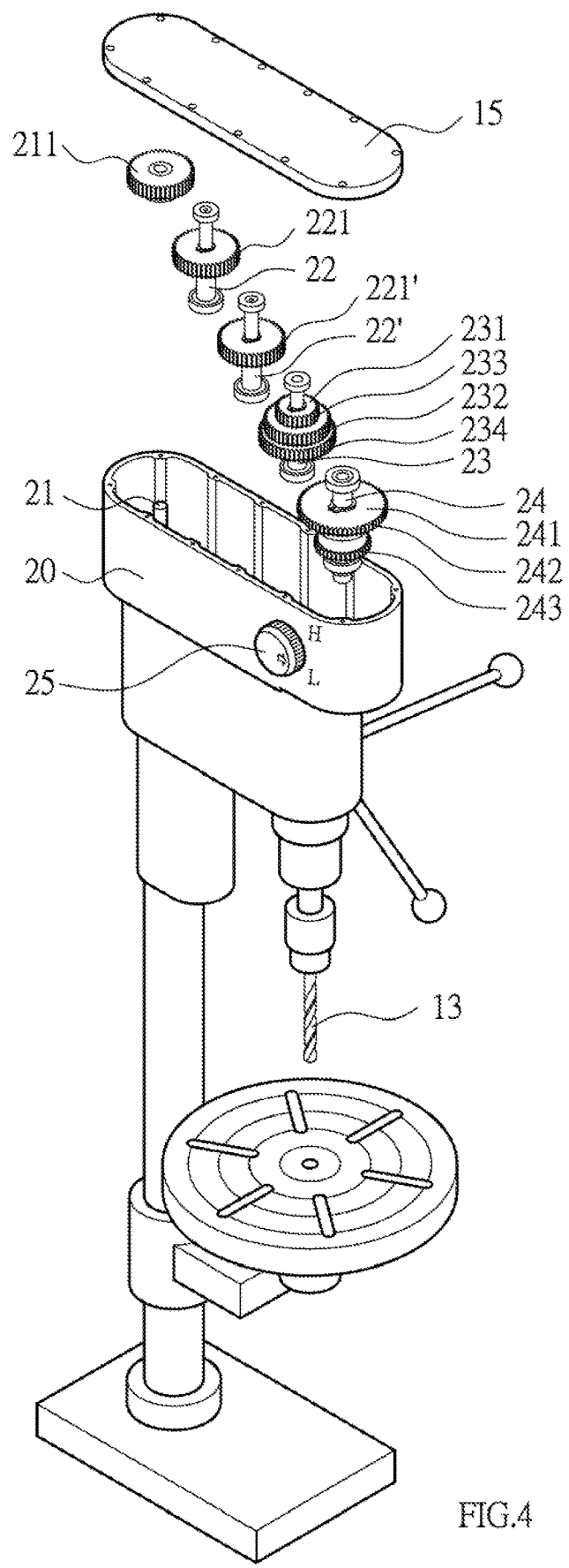
FIG. 4 is a perspective view showing the exploded components of a transmission structure of a drilling machine according to a preferred embodiment of the present invention.
Figure 5:
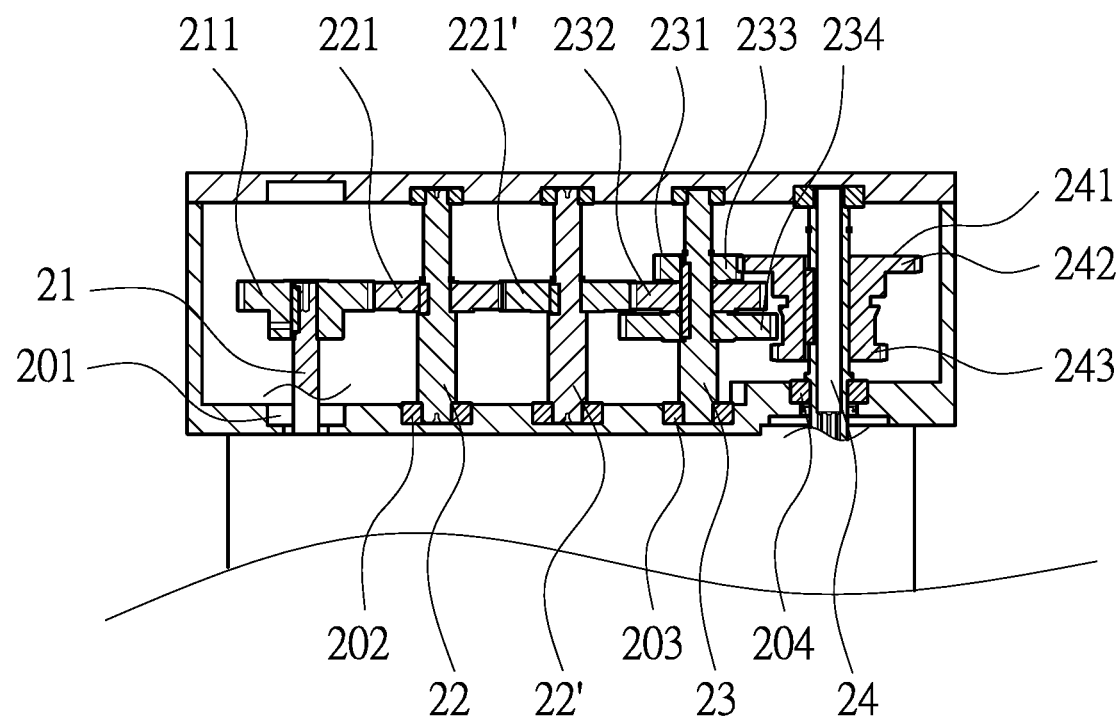
FIG. 5 is a cross sectional view showing the operation of the transmission structure of the drilling machine according to the preferred embodiment of the present invention.
Figure 6:
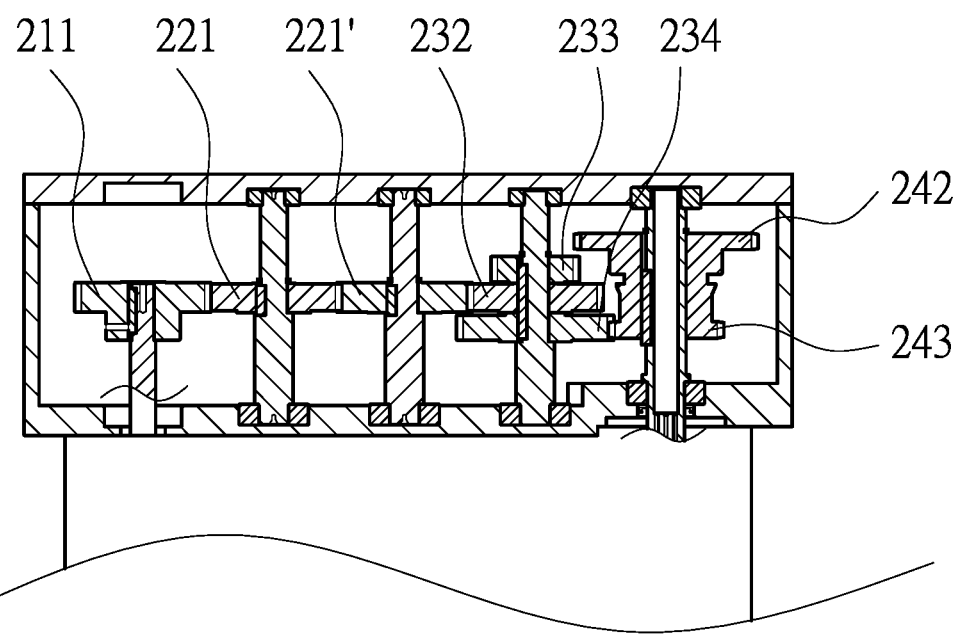
FIG. 6 is another cross sectional view showing the operation of the transmission structure of the drilling machine according to the preferred embodiment of the present invention.

With reference to FIGS. 4-6, a transmission structure of a drilling machine according to a preferred embodiment of the present invention comprises: a housing 20 in which a first accommodation groove 201, a second accommodation groove 202, a third accommodation groove 203, and a fourth accommodation groove 204 are defined; a drive shaft 21 housed in the first accommodation groove 201, a guide shaft 22 accommodated in the second accommodation groove 202, a speed shaft 23 housed in the third accommodation groove 203, and a driven shaft 24 accommodated in the fourth accommodation groove 204; a drive gear 211 connected on the drive shaft 21 and directly driven by a motor (not shown); a guide gear 221 coupled on the guide shaft 22 and meshing with the drive gear 211; a speed change gear assembly 231 connected on the speed shaft 23 and including a connection gear 232, a first speed change gear 233, and a second speed change gear 234 which are coaxially connected, wherein a diameter of the first speed change gear 233 is different from that of the second speed change gear 234, and the connection gear 232 meshes with the guide gear 221; a driven gear assembly 241 coupled on the driven shaft 24 and including a first driven gear 242 and a second driven gear 243 which are coaxially connected and corresponding to the first speed change gear 233 and the second speed change gear 234 respectively, the driven shaft 24 driving a drill bit of the drilling machine, wherein a diameter of the first driven gear 242 is more than that of the second driven gear 243, and the lid 15 covers the housing 20; a control knob 25 configured to drive the driven gear assembly 241 to move upward and downward; wherein when the driven gear assembly 241 moves downward, the first driven gear 242 meshes with the first speed change gear 233 so that the driven shaft 24 rotates at a low speed; when the driven gear assembly 241 moves upward, the second driven gear 243 meshes with the second speed change gear 234 so that the driven shaft 24 rotates at a high speed.

The speed change gear assembly 231 includes at least two speed change gears of different diameters, and the driven gear assembly 241 includes at least two driven gears of different diameters so that a rotation speed of the drilling machine changes.

The drive shaft 21 is connected with the motor, and the driven shaft 24 is coupled with the drill bit, hence when a distance between the drive shaft 21 and the driven shaft 24 is far, multiple guide shafts 22, 22' and multiple guide gears 221, 221' are arranged based on using requirements, wherein a first guide gear 221 meshes with the drive gear 211, a second guide gear 221' meshes with the connection gear 232, and the first guide gear 221 meshes with the second guide gear 221'.

Thereby, the transmission structure of the drilling machine has advantages as follows:

1. When the drilling machine drills holes after changing the rotation speed, the driven gear assembly 241 is controlled by the control knob 24 so as to move upward and downward, and the at least two driven gears of different diameters respectively mesh with the at least two speed change gears of different diameters, thus changing the rotation speed easily and safely.

2. The transmission efficiency of the drilling machine is quite high by way of one or the at least two speed change gears and driven gears. The drilling machine has prolonged service life and is maintained at a low cost.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A transmission structure of a drilling machine comprising:
 a housing in which a first accommodation groove, a second accommodation groove, a third accommodation groove, and a fourth accommodation groove are defined;
 a drive shaft housed in the first accommodation groove, at least one guide shaft accommodated in the second accommodation groove, a speed shaft housed in the third accommodation groove, and a driven shaft accommodated in the fourth accommodation groove;
 a drive gear connected on the drive shaft and directly driven by a motor;
 at least one guide gear coupled on the at least one guide shaft and meshing with the drive gear;
 a speed change gear assembly connected on the speed shaft and including a connection gear, at least two speed change gears which are coaxially connected and have different diameters respectively, wherein the connection gear meshes with the at least one guide gear;
 a driven gear assembly coupled on the driven shaft and moving upward and downward along the driven shaft, and the driven gear assembly including at least two driven gears which are coaxially connected and corresponding to at least two speed change gears respectively, wherein the at least two driven gears have different diameters respectively, and the driven shaft drives a drill bit of the drilling machine;
 wherein when the driven gear assembly moves downward, one of the at least two driven gears with a larger diameter meshes with the first speed change gear so that the driven shaft rotates at a low speed; when the driven gear assembly moves upward, another of the at least two driven with a smaller diameter meshes with the second speed change gear so that the driven shaft rotates at a high speed.

2. The transmission structure as claimed in claim 1, wherein multiple guide shafts and multiple guide gears are arranged based on using requirements, wherein a first guide gear meshes with the drive gear, a second guide gear meshes with the connection gear, and the first guide gear meshes with the second guide gear.

3. A drilling machine comprising the transmission structure of claim 1.

4. A drilling machine comprising the transmission structure of claim 2.

* * * * *